Figure 1:
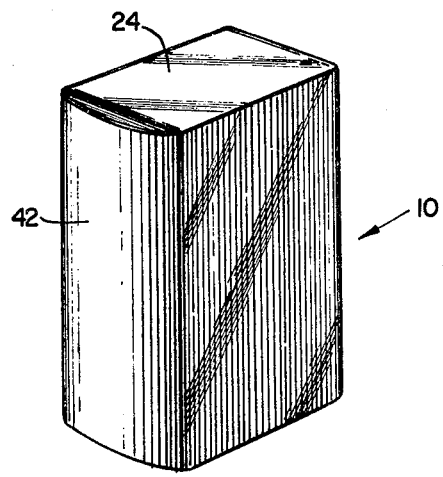

Feb. 23, 1965   R. SWEENEY   3,170,618
DISPOSABLE PET SANITARY STATION
Filed July 29, 1963   2 Sheets-Sheet 1

INVENTOR.
ROBERT SWEENEY
BY *Morse & Altman*
ATTORNEYS

Feb. 23, 1965  R. SWEENEY  3,170,618
DISPOSABLE PET SANITARY STATION
Filed July 29, 1963  2 Sheets-Sheet 2

INVENTOR.
ROBERT SWEENEY
BY
Morse & Altman
ATTORNEYS

3,170,618
DISPOSABLE PET SANITARY STATION
Robert Sweeney, 33 Stoughton St., Medford, Mass.
Filed July 29, 1963, Ser. No. 298,195
1 Claim. (Cl. 229—33)

This invention relates generally to disposable sanitary stations for pet animals and more particularly is directed towards improvements in sanitary stations of the sort shown in my co-pending application Serial No. 210,467, filed July 17, 1962, now Patent No. 3,154,052, issued October 27, 1964.

In my co-pending application there is disclosed a self-packaging, disposable sanitary station for pet animals comprising a one-piece box having articulated lid and bottom portions enclosing a bag of granular absorbent material. When opened the box converts into a flat tray over which the granular material is spread for use by the pet. When the station is ready to be discarded, the granular material is shifted to one end of the tray and the opposite end is folded back over to close the box into its original package form.

The present invention has for its object the providing of improvements in self-packaging, disposable sanitary stations for pet animals.

More specifically, this invention has for its object the providing of improvements in disposable sanitary stations of the sort described in my co-pending application.

Another object of this invention is to provide a combination tray and package for a disposable sanitary station for pet animals which package and tray combination is of improved design and construction.

A further object of this invention is to provide a tightly closing yet easily opened package having particular utility as a sanitary station of the above sort.

A still further object of this invention is to provide a sanitary station of the above sort which closes tightly without gaps around its marginal edge and without buckling the side panels.

Yet another object of this invention is to provide a package of the above sort having a back hinge portion of improved construction.

More particularly, this invention features a disposable, self-packaging sanitary station for pet animals comprising a combination box and tray having articulated lid and bottom portions with upright side and end panels characterized by a rounded hinged back. As a feature of this invention the end panels of the box are inclined slightly inward to eliminate frictional engagement between the end panels when the box is in a closed position and also to eliminate the formation of gaps along the sealing edges of the box when closed.

Figure 2:
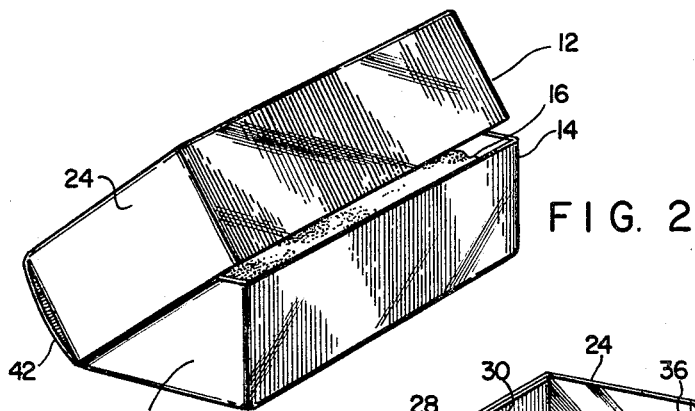
Figure 3:
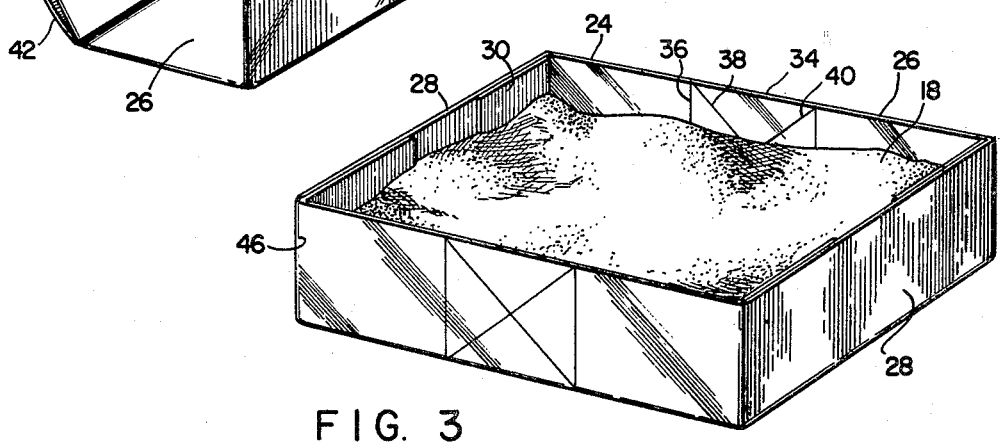
Figure 4:
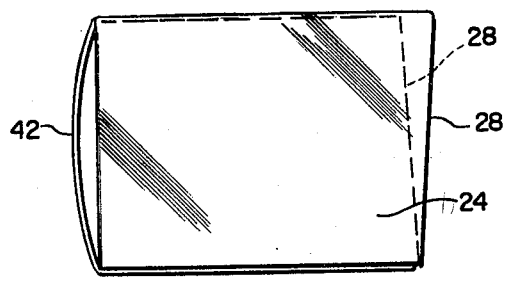
Figure 5:
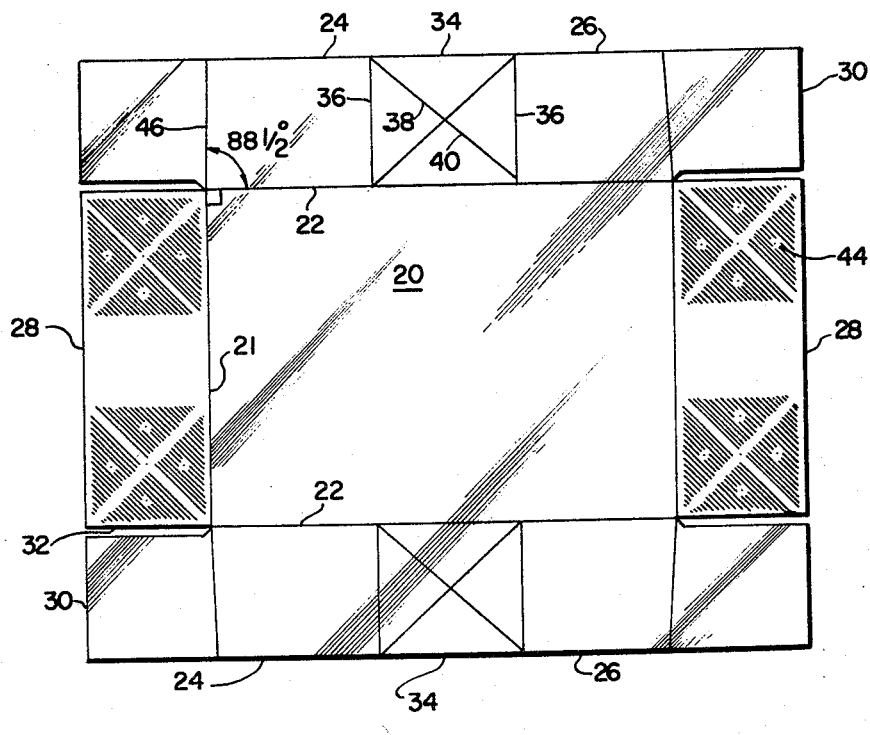

But these and other features of the invention, along with further objects and advantages thereof, will become more fully apparent from the following detailed description of a preferred embodiment of the invention, with reference being made to the accompanying drawings in which:

FIG. 1 is a view in perspective of a fully closed self-packaging sanitary station made according to the invention, FIG. 2 is a view in perspective showing the station in a partly opened condition, FIG. 3 is a perspective view showing the station in a fully opened condition, FIG. 4 is a top plan view of the station in a fully closed position, and, FIG. 5 is a plan view of the box blank employed in the invention.

Referring now to the drawings, the reference character 10 generally indicates a combination package and tray for a disposable sanitary station for pet animals. The package comprises a one-piece carton having articulated lid and bottom portions 12 and 14 which are adapted to fold into the fully closed position of FIG. 1 or to open into a tray as shown in FIG. 3. The combination package and tray includes a bag 16 generally conforming in size and shape to the closed box of FIG. 1 and containing a quantity of dry, granular absorbent material 18. It will be understood that when the package is opened and converted into the tray of FIG. 3 the bag 16 is also opened and the contained absorbent material is spread over the tray for use by the pet.

For the absorbent material, ground clay has been found to be satisfactory because of its highly absorbent odorless and granular characteristics. Other materials such as sand, sawdust or a diatomaceous earth may also be used to advantage. For best results, attapulgite is preferred. This type of clay may be defined as a hydrated magnesium aluminum silicate and is known more commonly as fuller's earth.

Referring now more particularly to FIG. 5 a box blank will be described in detail. The blank has a rectangular configuration, typically 22¼" in length and 18½" in width. Typically the blank is formed from a sheet of relatively stiff paperboard material treated with a waterproofing substance such as wax or plastic. Other inexpensive sheet materials suitable for use in making moisture proof cartons may be employed. When the carton is fabricated from paperboard material, the grain of the paperboard should be running in the lateral rather than in the longitudinal direction in order to produce a box of improved construction and appearance.

The blank shown in FIG. 5 includes a rectangular center panel 20, typically 14¼" in length by 10½" in width. Transverse and longitudinal score lines 21 and 22 define side panels 24 and 26 for the top and bottom trays respectively and end panels 28. Tabs 30 are located at the ends of the side panels 24 and 26 and are separated from the end panels 28 by means of cut-outs 32. The end panels 28 typically are 4" in depth and 10½" in width corresponding to the width of the center panel 20. The side panels 24 and 26 similarly are 4" in depth but differ in the width with the end panel 24 being 5¼" in width while the end panel 26 is 4¹⁵⁄₁₆" in width.

The side panels 24 and 26 which extend on either side of the center panel 20 are located on either end of a webbed section 34 typically 4¹⁄₁₆" in width and having the same 4" depth as the side panels and end panels. The web section 34 is characterized by a pair of parallel score lines 36 extending between the score line 22 and the outer side edge of the blank. Diagonal score lines 38 and 40 extend from either corner of the web portion and intersect at the center thereof. It will be noted that the web portion 34 is slightly wider than the depth of the remaining end panels and side panels. With this construction, when the box is folded into a fully set up condition, that portion of the center panel 20 between the opposing web sections will form the back or hinged portion of the package and will assume a slightly rounded back 42 as best seen in FIG. 4. The rounded back effect is achieved by the web section 34 having a width in excess of the depth of the side panels and end panels and by orienting the grain of the paperboard material in a lateral rather than in a longitudinal direction. A smoothly rounded curve is achieved with no cracking or buckling of the box, creating a book back effect which suggests to the consumer that the unit is opened in the same fashion as a book.

Referring again to FIG. 5, it will be noted that the end panels 28 are fabricated with unwaxed areas 44 in order to provide a proper bonding surface for adhesive which subsequently will be applied when the box is being set up. It will be understood that the reverse side of the tabs 30 are also uncoated since they will register with the areas 44 when the box is set up.

It is important to note that while the score line 21 is at a right angle to the score line 22 an extension score line 46, which defines the outer end of the side panels 24 and 26 and also forms the tabs 30, is less than 90° and typically is on the order of 88½° with respect to the score line 22. When the box is set up the end panels 28 will thereby be inclined inwardly as best shown in FIG. 4. It will be noted that the opposing end panels 28 are not in surface to surface contact with one another when the box is closed and, as a result, the box, which normally is sealed by a short piece of tape, will open in an extremely easy manner when the tape is broken. In addition, the inclined end panels also eliminate the gaps or bulges which normally form in carton in which the end panels overlie one another in surface to surface contact when the box is closed. A still further advantage of a box with this construction is that the side panels near the corners are not bent or buckled when opening or closing the carton by reason of the fact that the articulated lid and bottom portion swing freely over one another.

The package described herein has numerous advantages over previous types of sanitary stations. The entire package and contents are disposable and the package is easily opened and converted into the tray. Further, the tray is easily folded back into box form with all sides fully and tightly sealed when closed so that there is no objectionable odor or leakage when the package is placed in a trash barrel, for example. The unit is of well-balanced design and permits convenient shipping to retailers and provides advantages in the display of the package by retailers since the package may be easily displayed on shelves in an upright position as shown in FIG. 1. There is no leakage problem since the granular material is completely enclosed in a substantially crush proof container. The rounded book type back for the package is unique in that it provides a sturdy, easily formed and efficient working hinge which also affords a pleasing design.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

Having thus described my invention, what I claim and desire to obtain by Letters Patent of the United States is:

A carton, comprising integrated articulated lid and bottom portions, said portions being formed from a rectangular body panel, side and end panels disposed along the marginal edges of said body panel and arranged generally normal to the plane thereof, said carton defining a closed container with the side and end panels of the lid portion overlapping the side and end panels of the bottom portion when said lid and bottom portions are folded against one another and defining a flat open tray with continuous surrounding upright sidewalls when said lid and bottom portion are folded open into substantially co-planar positions, a back hinge portion connecting said lid and bottom portion, said hinge portion being of a width greater than said side panels, said hinge portion defining an outward curve when said lid and bottom portions are folded against one another.

References Cited by the Examiner
UNITED STATES PATENTS

| | | | |
|---|---|---|---|
| 1,850,829 | 3/32 | Cole | 229—36 |
| 1,939,744 | 12/33 | Wellman | 229—33 |
| 2,252,023 | 8/41 | Mulnix | 229—36 |
| 2,295,515 | 9/42 | Hoag | 229—32 |
| 2,741,223 | 4/56 | Winborn | 119—1 |
| 2,914,234 | 11/59 | Hazelwood | 229—31 |

FRANKLIN T. GARRETT, *Primary Examiner.*

HUGH R. CHAMBLEE, *Examiner.*